United States Patent
Headings

(10) Patent No.: US 9,004,235 B2
(45) Date of Patent: Apr. 14, 2015

(54) TROLLEY BRAKE AND METHOD OF USING SAME

(75) Inventor: Randy Headings, Plain City, OH (US)

(73) Assignee: Darby Adventure Systems LLC, Plain City, OH (US)

(*) Notice: Subject to any disclaimer, the term of this patent is extended or adjusted under 35 U.S.C. 154(b) by 123 days.

(21) Appl. No.: 13/594,969

(22) Filed: Aug. 27, 2012

(65) Prior Publication Data

US 2013/0220743 A1 Aug. 29, 2013

Related U.S. Application Data

(60) Provisional application No. 61/528,542, filed on Aug. 29, 2011.

(51) Int. Cl.
  *B65H 59/16* (2006.01)
  *B61H 9/02* (2006.01)
(52) U.S. Cl.
  CPC ........................................ *B61H 9/02* (2013.01)
(58) Field of Classification Search
  USPC .......... 188/65.1, 65.2; 104/113, 112, 115, 53; 105/150
  See application file for complete search history.

(56) References Cited

U.S. PATENT DOCUMENTS

| | | | |
|---|---|---|---|
| 6,666,773 B1 | 12/2003 | Richardson | |
| 7,966,941 B1 | 6/2011 | Brannan | |
| 8,234,980 B2 | 8/2012 | Boren | |
| 2003/0066453 A1* | 4/2003 | Cylvick | 104/53 |
| 2004/0198502 A1* | 10/2004 | Richardson | 472/49 |
| 2011/0239898 A1* | 10/2011 | Brown | 105/150 |
| 2012/0160122 A1* | 6/2012 | Lerner et al. | 104/113 |

* cited by examiner

*Primary Examiner* — Melanie Torres Williams

(74) *Attorney, Agent, or Firm* — Standley Law Group LLP

(57) ABSTRACT

A brake for a trolley which travels atop a zip line is presented. The brake includes a brake body having a brake body with a top plate and two side plates extending downward from the top plate, the top plate having an underside which faces the zip line. One or both of the side plates may contain an aperture for accepting a rigid member which secures the trolley to the brake body. A brake pad is preferably positioned on the underside of the top plate. Exemplary embodiments may contain a brake extension which connects with the brake body and extends downward towards the user.

17 Claims, 3 Drawing Sheets

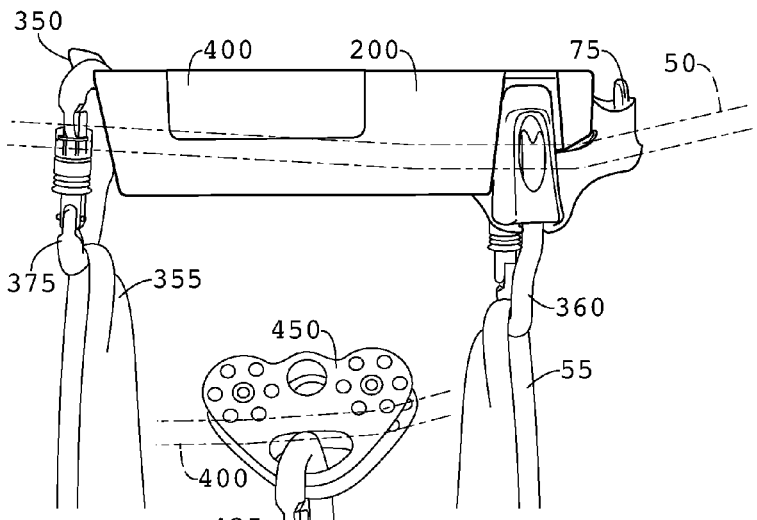
Fig. 6
Fig. 7
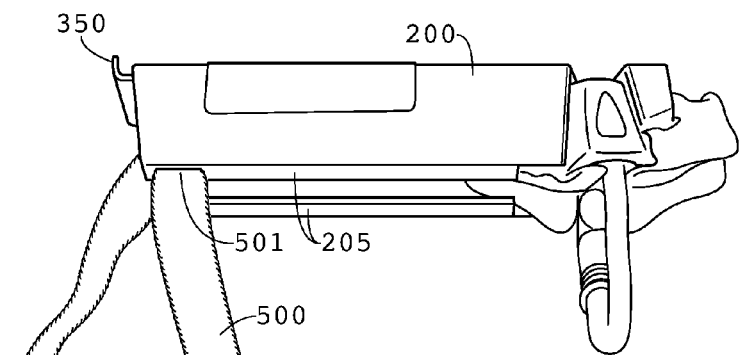
Fig. 8
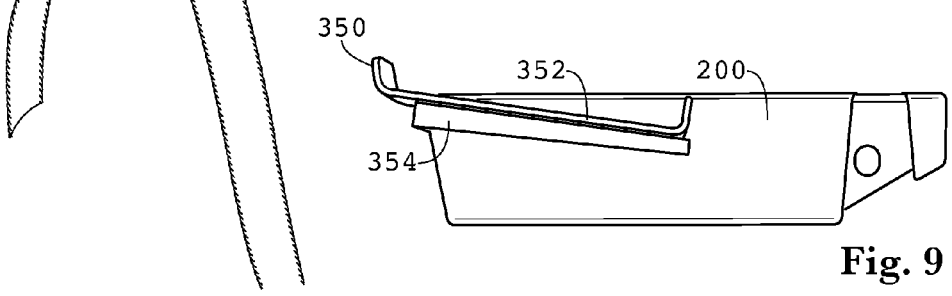
Fig. 9

TROLLEY BRAKE AND METHOD OF USING SAME

CROSS-REFERENCE TO RELATED APPLICATIONS

This application claims priority to Co-pending U.S. Application No. 61/528,542, filed on Aug. 29, 2011 and is herein incorporated by reference in its entirety.

TECHNICAL FIELD

Exemplary embodiments generally relate to a device for reducing the speed of a trolley used in association with a zip line, and a method for using the device.

BACKGROUND OF THE ART

Zip lines are thrill-ride systems which are predominantly used for amusement-type operations. A common zip line system includes a suspended cable (constructed of aluminum, steel or similar metallic material) stretched between, and rigidly affixed to, separate supporting structures. One end of the suspended cable is affixed to a support structure which is located at an elevation higher than that of the opposite end. The result is a downward slope of the suspended cable. The higher end of the suspended cable is referred to as the beginning, and the lower end is referred to as the end. A common zip line trolley consists of either one or two pulleys affixed to a common housing. The pulleys of the trolley are placed on top of the suspended cable and a rider holds on to, or is tethered to, the trolley via a conventional safety harness. The downward slope of the suspended cable facilitates a gravitational force which propels the trolley and rider along the suspended cable.

Zip lines are used by individuals at theft own personal locations as well as by businesses in commercial applications. Many commercial zip line canopy tours employ the use of multiple suspended cables allowing for a variety of rides for patrons. Common trolleys are most often constructed of steel, or similar rigid material. Unfortunately, they do not afford a rider the ability to control his or her speed of descent while traversing along the suspended cable. Devices and systems similar to zip lines are witnessed within the oil industry relating to lowering endangered personnel from oil derrick towers.

Various types of braking systems for common zip lines are known within the art. The most common methods of zip line braking systems presently available include gravity braking, impact braking and frictional braking. None of the braking systems presently available, for common zip lines allow a rider control of his or her speed in a safe, economical and easy-to-use manner.

A gravity braking method relies on the natural sag in the suspended cable coupled with the rider's weight to bring he or she to a stop. The ride ends at a point where the rider's momentum ceases to propel the rider along the suspended cable. These designs do not always permit the user to end at the preferred destination and may require further repositioning of the user or moving a ladder or walkway to the user's ending position.

Impact braking methods commonly utilize an elastic cord (often a bungee cord or other similar material) along with a small block. The block is affixed close to the ending-end and in a manner such that it can slide freely along the suspended cable. One end of the bungee cord is fastened to the block and the other end is rigidly affixed to a point on the ground. When a rider traversing along the suspended cable makes contact with the block, the bungee cord expands and brings the rider to a stop. In addition to elastic cords, rubber tires affixed to the ending-end of a suspended cable are often used as an impact braking method. Rubber tires witness similar results and potential safety hazards as those experienced with elastic cords. Further, impact braking is known to cause the rider to swing, sometimes in a violent and rapid manner.

Regarding frictional braking, one form requires the rider to wear a glove. While traversing along the suspended cable, the rider squeezes the suspended cable with the hand wearing the glove. This creates dynamic friction along the suspended cable, thus slowing the rider. This can be dangerous in that the rider can wear a hole through the glove and rub his or her skin along the suspended cable. Another form of frictional braking requires the rider to drag his or her feet along the ground while approaching the ending-end. Both of these methods are unpredictable and produce unacceptable results.

Other braking methods known within the art add considerable expense and complexity to a common zip line. Many are rigidly fixed to a particular suspended cable or a particular trolley, thus not easily transportable among other suspended cables. They often include a complicated series of additional pulleys and cables which all must work in unison to be operational. Should any one piece of such a braking system malfunction, the entire braking mechanism and rider's safety can be jeopardized.

Further, some other braking methods force the rider to face down the cable (i.e. towards the end of the run). While this may be desirable in some applications, some riders may desire to face sideways or even backwards for a different experience while traversing from the beginning to end.

SUMMARY OF THE EXEMPLARY EMBODIMENTS

Exemplary embodiments relate to a trolley brake having a brake body which is fastened to the trolley. The zip line preferably travels below a pair of rollers or pulleys on the trolley and through a center channel of the brake body. A brake pad may be placed between the zip line and a bottom portion of the brake body such that a downward force on the brake body causes the brake pad to contact the zip line. More downward force applies more braking force to the zip line and vice versa so that the user can precisely control the desired amount of braking. The brake pad may be oriented with an upward angle as you move from the trolley to the rear of the brake body to account for a natural arc created in the zip line when loaded with the weight of a user.

The foregoing and other features and advantages will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 6 is a side planar view of another embodiment of the trolley brake.

FIG. 7 is a side planar view of an embodiment used with a redundant zip line.

FIG. 8 is a side planar view of another embodiment using a brake extension.

FIG. 9 is a side sectional view of an exemplary embodiment with a sloped internal member where a vertical section cut has been made down the center of the brake.

DETAILED DESCRIPTION

Herein the terms 'front' and 'rear' may be used to describe the relationship between the various elements shown in the various embodiments. The term 'front' is used herein to denote a direction towards the end of the zip line run, in other words in the direction the user is travelling along the zip line. The term 'rear' is used herein to denote a direction towards the beginning of the zip line run, or opposite the direction the user is travelling along the zip line.

Figure 1:
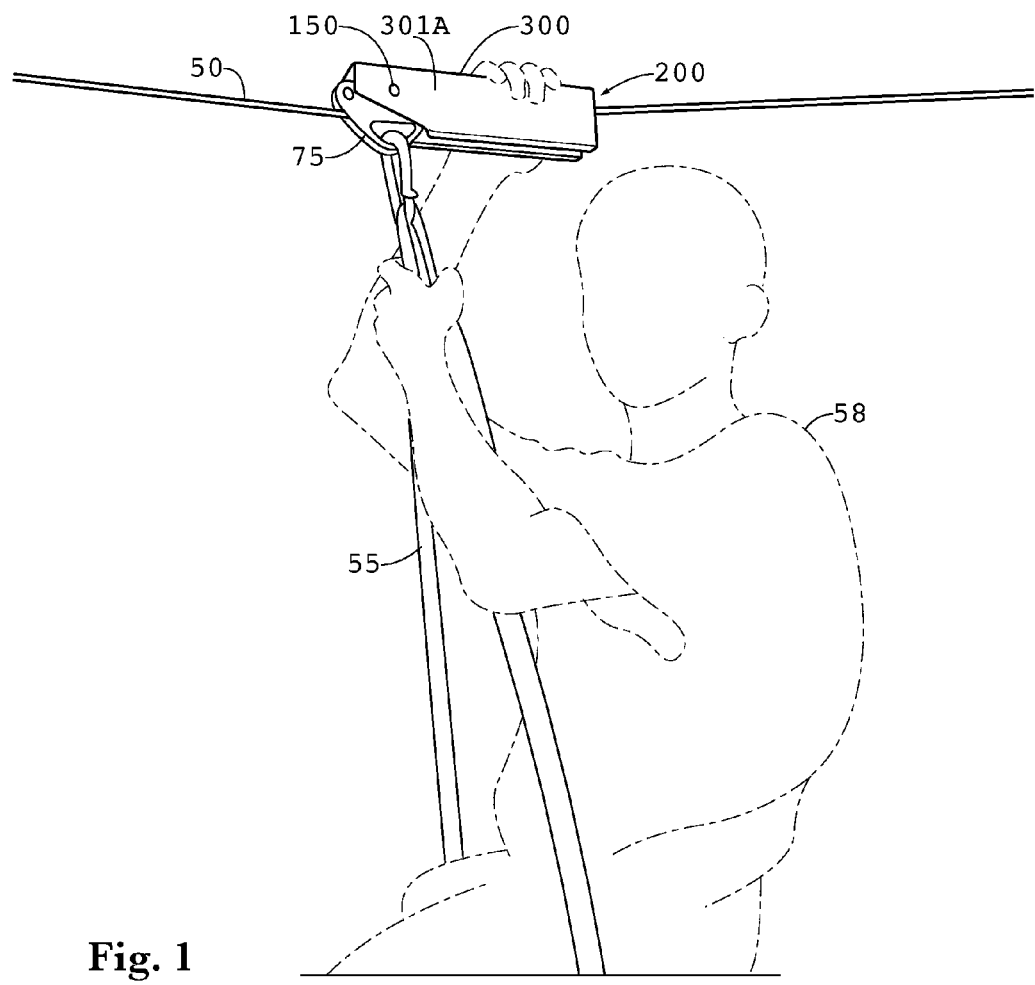
FIG. 1 is a side illustration view of an exemplary embodiment of the trolley brake in place with a zip line and a user.

FIG. 1 is a side illustration view of an exemplary embodiment of the trolley brake in place with a zip line 50 and a user 58. Generally, the trolley 75 will rest atop the cable 50 and is used to support a harness or retention device 55 which is attached to the user 58. The brake body 200 is preferably fastened to the trolley 75 such that an application of downward pressure or force by the user 58 to the brake body 200 will cause the travelling speed of the trolley 75 to be reduced. The brake body 200 may be hingedly fastened to the trolley 75 or may be fixedly fastened to the trolley 75. The brake body 200 is preferably comprised of three plate-like elements: top plate 300, side plate 301A, and side plate 301B. Generally, the top plate 300 is oriented substantially horizontal while the side plates 301A/B are oriented substantially vertically. Preferably, although not required, the plates are metallic, either steel or aluminum.

Generally speaking, the more force applied by the user 58 to the brake body 200 will result in a more rapid deceleration of the trolley 75, and less force will result in a less rapid deceleration of the trolley 75. In this way, the user 58 can not only bring the trolley 75 to a stop, but can also simply decrease the travelling speed of the trolley 75 to provide for a longer ride from beginning to end or to allow the user 58 to extend certain portions of the zip line run for a longer period of time.

Figure 2:
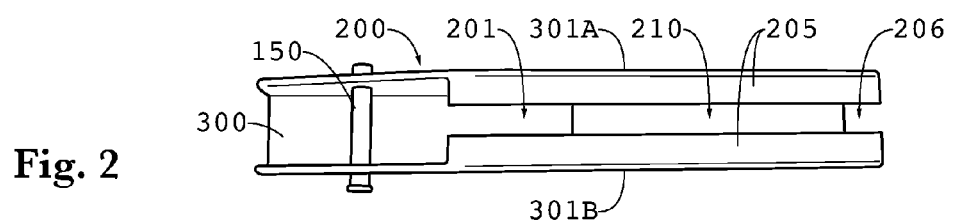
FIG. 2 is a bottom planar view of the embodiment shown in FIG. 1.

FIG. 2 is a bottom planar view of the embodiment shown in FIG. 1. A rigid member 150 may be used to establish a connection between the brake body 200 and the trolley 75. Preferably, the rigid member 150 is located within one or more apertures in the side plates 301A/B and passes through one or more apertures in the trolley 75. The rigid member 150 may have any number of different cross-sectional geometries, including but not limited to circular, square, triangle, hexagon, etc. The rigid member 150 may create a hinged connection between the brake body 200 and the trolley 75 or may create a fixed connection between the two. A center channel 201 may travel down the center of the brake body 200 and adapted to accept the zip line 50. A brake pad 210 may be placed within the center channel 201 and preferably towards the rear portion of the brake body 200. In this embodiment, bottom surfaces 205 are used so that the zip line 50 is almost entirely enclosed within the brake body 200 with the exception of slot 206, which may be sized so that the brake body 200 can slide overtop the zip line 50 to allow the trolley brake to be installed without having to disconnect the ends of the zip line 50. The use of bottom surfaces 205 to further enclose the zip line 50 within the brake body 200 may reduce the risk of a user coming into contact with the zip line 50 or being between the zip line 50 and the brake body 200. In an exemplary embodiment, the bottom surfaces 205 may be plate-like members which begin at the side plates 301A/B and extend inwardly towards the center of the brake body 200.

Figure 3:
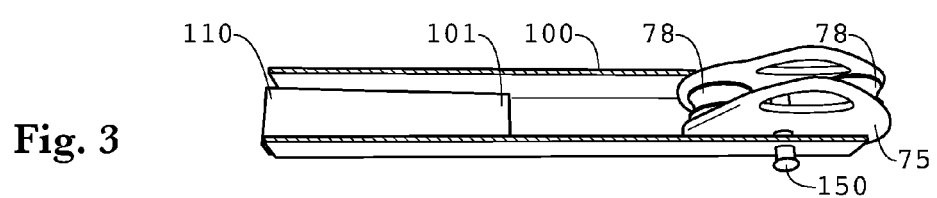
FIG. 3 is a bottom perspective view of another embodiment of the trolley brake with an associated trolley.

FIG. 3 is a bottom perspective view of another embodiment of the trolley brake with an associated trolley 75. This brake body 100 preferably contains a center channel 101 which allows the zip line 50 to enter between the trolley 75 and brake body 100, travel down the center of the brake body 100, and exit the rear portion of the brake body 100. A brake pad 110 is preferably placed near the rear portion of the brake body 100 and covering at least a portion of the center channel 101. Preferably, the brake pad 110 is placed on the underside of the top portion of the brake body 100. Thus, when a downward force is applied to the top portion of the brake body 100, this force is translated to the brake pad 110 and applied to the zip line 50.

Figure 4:
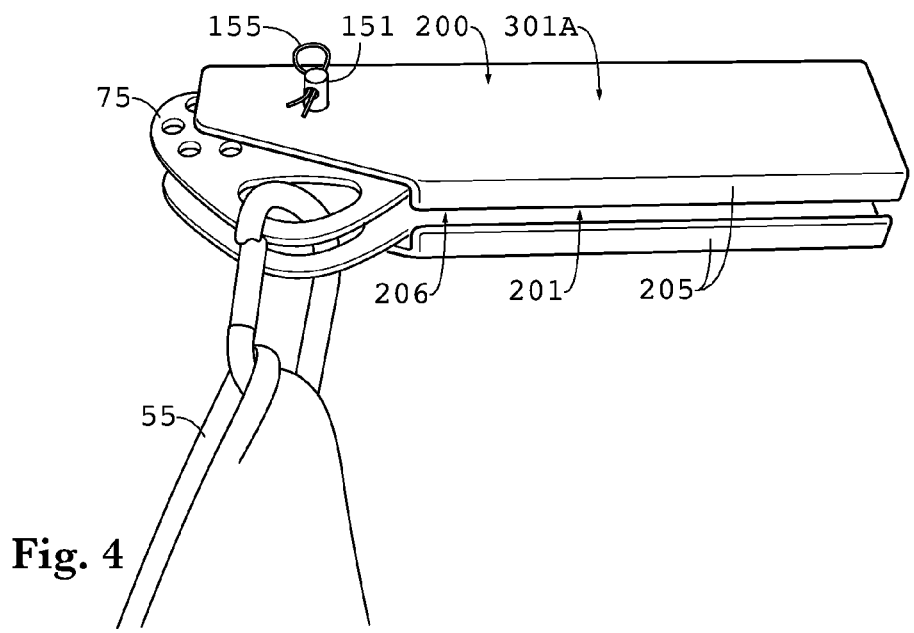
FIG. 4 is a side perspective view of another embodiment of the trolley brake with an associated trolley and a harness or retention device.

FIG. 4 is a side perspective view of another embodiment of the trolley brake with an associated trolley 75 and a harness or retention device 55. In this embodiment, a shaft 151 is used to fasten the trolley 75 to the brake body 200. The shaft 151 passes through one or more apertures in the side plates 301A/B and trolley 75. A hole passes through the shaft 151 and accepts a pin 155 in order to secure the shaft 151 in place. The pin 155 may be any mechanical device for retaining the shaft 150 within the trolley 75 and brake body 200. The pin 155 could be any one of the following: R-clip, R-pin, hairpin cotter, split pin, hitch pin, spring cotter pin, bowtie cotter pin, circle cotter pin, and linchpin. In other embodiments the shaft 151 could be a bolt, where a nut is used to secure the bolt within the trolley 75 rather than a pin. It should also be noted that some embodiments may provide the trolley 75 and brake body 200 as a single unit, where the brake body 200 is simply an extension of the trolley 75 such that no shaft or bolt is required to hold the two components together.

Figure 5:
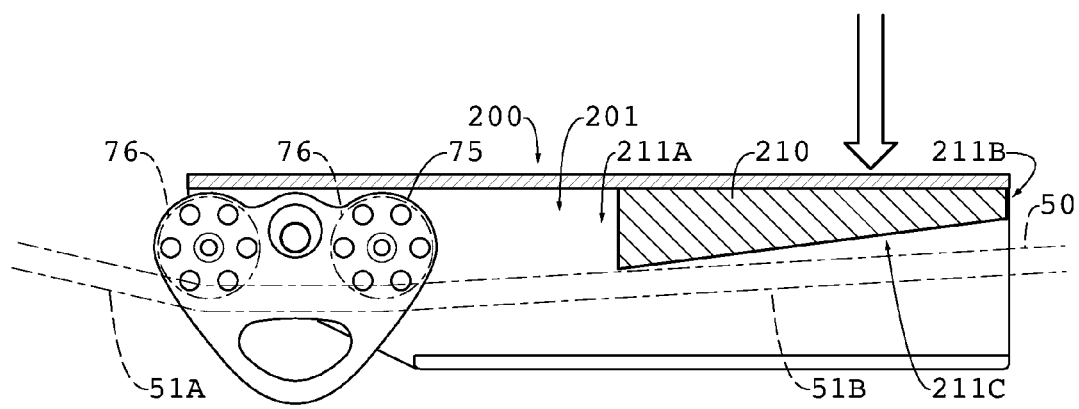
FIG. 5 is a side sectional view of the embodiment shown in FIG. 4 where a vertical section cut has been made down the center of the brake.

FIG. 5 is a side sectional view of the embodiment shown in FIG. 4 where a vertical section cut has been made down the center of the brake. The trolley 75 may contain a pair of rollers or pulleys 76 which rest atop the zip line 50. As the zip line 50 passes through the brake body 200, it may be described as two portions 51A and 51B. Generally, the front zip line portion 51A comprises the portion of the zip line 50 which is in front of or within the trolley 75. Also generally, the rear zip line portion 51B comprises the portion of the zip line 50 which is behind the trolley 75. During operation, the rear portion of the zip line 51B may start as relatively horizontal at a position immediately behind the trolley 75, but gradually angles upward as you move to the rear portion of the brake body 200. This is a phenomenon due to the arc of the zip line 50 created by the downward force of the user's weight. To account for this phenomenon and to increase the lifetime and performance of the brake, the brake pad 210 also has an angle which slopes upward as you move from the trolley 75 to the rear portion of the brake body 200. In other words, the brake pad 210 may be described as having a front edge 211A, rear edge 211B, and bottom edge 211C, where the front edge 211A and rear edge 211B are substantially vertical and the front edge 211A is longer than the rear edge 211B. Still further, the bottom edge 211C is preferably oriented at an angle relative to the top portion of the brake body 200. Although front edge 211A, rear edge 211B, and bottom edge 211C are shown as substantially linear in FIG. 7, this is not required. Thus, front edge 211A, rear edge 211B, and bottom edge 211C may be arcs or curves. It is specifically contemplated for the bottom edge 211C to have an arc similar to the arc of the rear portion of the zip line 51B.

FIG. 6 is a side planar view of another embodiment of the trolley brake. Here, a carabiner 360 passes through both the trolley 75 and the brake body 200 so as to fix the two components together. A tab 350 is also positioned at the rear of the brake body 200 and may be used to secure another carabiner 375 which may be connected to a second harness or retention device 355. Here, the zip line runs through the carabiner 375 such that if a failure were to occur at the trolley 75 or brake body 200, the user would be supported by the carabiner 375 as it also surrounds the zip line 50. Of course, other embodiments may use apertures in the brake body 200 or other means for securing the carabiner 375 rather than the tab 350. This embodiment also places textured surfaces 400 on the top plate and side plates to aid in the user's ability to grip and operate the trolley brake.

FIG. 7 is a side planar view of an embodiment used with a redundant zip line 400. Here, a carabiner 425 (or other attaching means) passes through one or more apertures in the brake body 200 and trolley 75 in order to secure the two components together. The same carabiner 425 is also used to pass through a redundant trolley 450 which travels atop a redundant zip line 400. Thus, in this embodiment, if a failure were to occur on the zip line 50, the user would be supported by the redundant zip line 400.

FIG. 8 is a side planar view of another embodiment using a brake extension 500. Here, the brake body 200 is attached to a downward extending brake extension 500 which allows the user to have access to the brake body 200 without having to reach up to the actual brake body 200. In this particular embodiment, the bottom surface 205 contains an aperture 501 which is connected to the brake extension 500. Here, the aperture 501 is a slot which contains a strap as the brake extension 500. Of course, many variations on this concept are possible, where the brake extension 500 could instead be a rope, cable, or rigid member.

FIG. 9 is a side sectional view of an exemplary embodiment with a sloped internal member 352 where a vertical section cut has been made down the center of the brake. In this embodiment, a sloped internal member 352 is placed within the center channel of the brake body 200 where the member slopes upward from the front of the brake body 200 to the rear of the brake body 200. In other words, the distance between the top portion of the brake body 200 and the member 352 is higher towards the front of the brake body 200 and lower towards the rear of the brake body 200. The brake pad 354 is preferably attached to the underside of the member 352. Although not required, in this embodiment the sloped internal member 352 continues out the rear of the brake body 200 to produce the tab 350.

It should be noted that although shown and described in the figures, the side plates are not required for the invention. Some embodiments may utilize only the top plate for a lighter, simpler, more streamlined design. In other words, the side plates are optional and may not be used with some embodiments.

As used herein, the term 'brake pad' is any device which converts the kinetic energy of the trolley and user to thermal energy by friction. The brake pads 110 and 210 may be comprised of any of the following materials: ceramic compounds with or without metallic fibers, mineral fibers, cellulose, aramid, PAN, chopped glass, plastics, rubbers, elastomers, composites, and any combination of these.

The relative sizing of each component shown in the figures is not to be interpreted as a requirement of the invention or that they are accurately drawn to scale. Some components have been enlarged for clarity. Other components have been simplified for clarity. Finally, although shown as separate components in the figures, the brake body and trolley may be designed as a singular unit. Further, although sometimes shown with a hinged connection between the trolley and the brake body, this is not required. In other words, it is not necessary for the trolley and brake body to rotate relative to one another. These components may be cast or machined as a single unit or may be cast or machined separately and later assembled together so that they do not rotate relative to one another.

Having shown and described preferred embodiments, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A brake for a trolley which travels atop a zip line, the brake comprising:
a brake body having a top plate with an underside which faces the zip line; and
a brake pad covering at least a portion of the underside of the top plate; and
a textured surface positioned on the top plate.

2. The trolley brake of claim 1 further comprising:
two side plates extending downward from the top plate
an aperture in one of the side plates; and
a rigid member passing through the aperture.

3. The trolley brake of claim 2 further comprising:
a bottom surface connecting the two side plates; and
a slot which travels the length of the brake body and removes a portion of the bottom surface.

4. The trolley brake of claim 2 wherein:
the top plate is substantially horizontal and the side plates are substantially vertical.

5. The trolley brake of claim 1 wherein:
the rigid member is a carabiner.

6. The trolley brake of claim 1 further comprising:
a sloped internal member attached to the underside of the top plate where the member slopes upward from the front to the back of the brake body and where the brake pad is attached to the underside of the member.

7. The trolley brake of claim 5 wherein:
the carabiner is also attached to a second trolley which is positioned on a redundant zip line.

8. The trolley brake of claim 2 further comprising:
a hole in the rigid member; and
a pin passing through the hole.

9. The trolley brake of claim 1 further comprising:
a brake extension attached to the brake body and extending downward.

10. The trolley brake of claim 1 further comprising:
a tab positioned near a rear portion of the brake body.

11. The trolley brake of claim 10 further comprising:
a carabiner positioned atop the tab.

12. A brake for a trolley which travels atop a zip line, the brake comprising:
a brake body having front and rear portions and comprising a top plate, two side plates extending downward from the top plate, a bottom plate connecting the two side plates to define a substantially enclosed center channel, and a slot running down the bottom plate;

an aperture in one of the side plates; and a brake pad positioned within the channel and below the top plate wherein the brake pad is thinner near the rear portion of the brake body and thicker near the front portion of the brake body.

13. The trolley brake of claim 12 wherein:

the brake pad is curved to match the curvature of the zip line when loaded with the weight of a user.

14. The trolley brake of claim 12 further comprising:

a means for securing a redundant carabiner positioned near the rear portion of the brake body.

15. The trolley brake of claim 12 further comprising:

a brake extension attached to the brake body and extending downward.

16. The trolley brake of claim 12 wherein:

the carabiner also passes through a second trolley which is positioned on a redundant zip line.

17. A brake for a trolley which travels atop a zip line, the brake comprising:

a brake body having a top plate with an underside which faces the zip line; and a brake pad covering at least a portion of the underside of the top plate a sloped internal member attached to the underside of the top plate where the member slopes upward from the front to the back of the brake body and where the brake pad is attached to the underside of the member.

* * * * *